United States Patent
Huang et al.

(10) Patent No.: US 7,961,260 B2
(45) Date of Patent: Jun. 14, 2011

(54) STEREOSCOPIC DISPLAY DEVICE

(75) Inventors: Chiu-Jung Huang, Changhua County (TW); Cheng-Chung Hu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 282 days.

(21) Appl. No.: 12/357,365

(22) Filed: Jan. 21, 2009

(65) Prior Publication Data

US 2010/0110316 A1    May 6, 2010

(30) Foreign Application Priority Data

Nov. 4, 2008    (TW) ................................ 97142501 A (51) Int. Cl.
*G02F 1/1335*    (2006.01)
(52) U.S. Cl. ........................................................ 349/15
(58) Field of Classification Search ...................... 349/15
See application file for complete search history.

(56) References Cited

U.S. PATENT DOCUMENTS 7,453,529 B2 * 11/2008 Nam et al. ...................... 349/15

FOREIGN PATENT DOCUMENTS

JP    2006-189766    7/2006

* cited by examiner

*Primary Examiner* — Richard H Kim
(74) *Attorney, Agent, or Firm* — Winston Hsu; Scott Margo (57) ABSTRACT

The present invention discloses a stereoscopic display device with a parallax barrier. The parallax barrier includes: a first substrate; a plurality of first electrodes parallel to each other and stretching in one direction on the first substrate; a transparent insulation layer between the first substrate and the first electrodes; a plurality of second electrodes parallel to each other and stretching in one direction on the opposite side against the first electrodes; a common electrode between the second substrate and the transparent insulation layer; and a liquid crystal layer between the common electrode and the second electrodes. In particular, the plurality of first electrodes and second electrodes interlace with each other and each contains partial overlapping in the vertical direction.

15 Claims, 10 Drawing Sheets

FIG. 6c

STEREOSCOPIC DISPLAY DEVICE

BACKGROUND OF THE INVENTION

1. Field of the Invention

The present invention discloses a stereoscopic display device, more particularly, a stereoscopic display device that can be switched freely between 2D/3D display modes.

2. Description of the Prior Art

Figure 1:
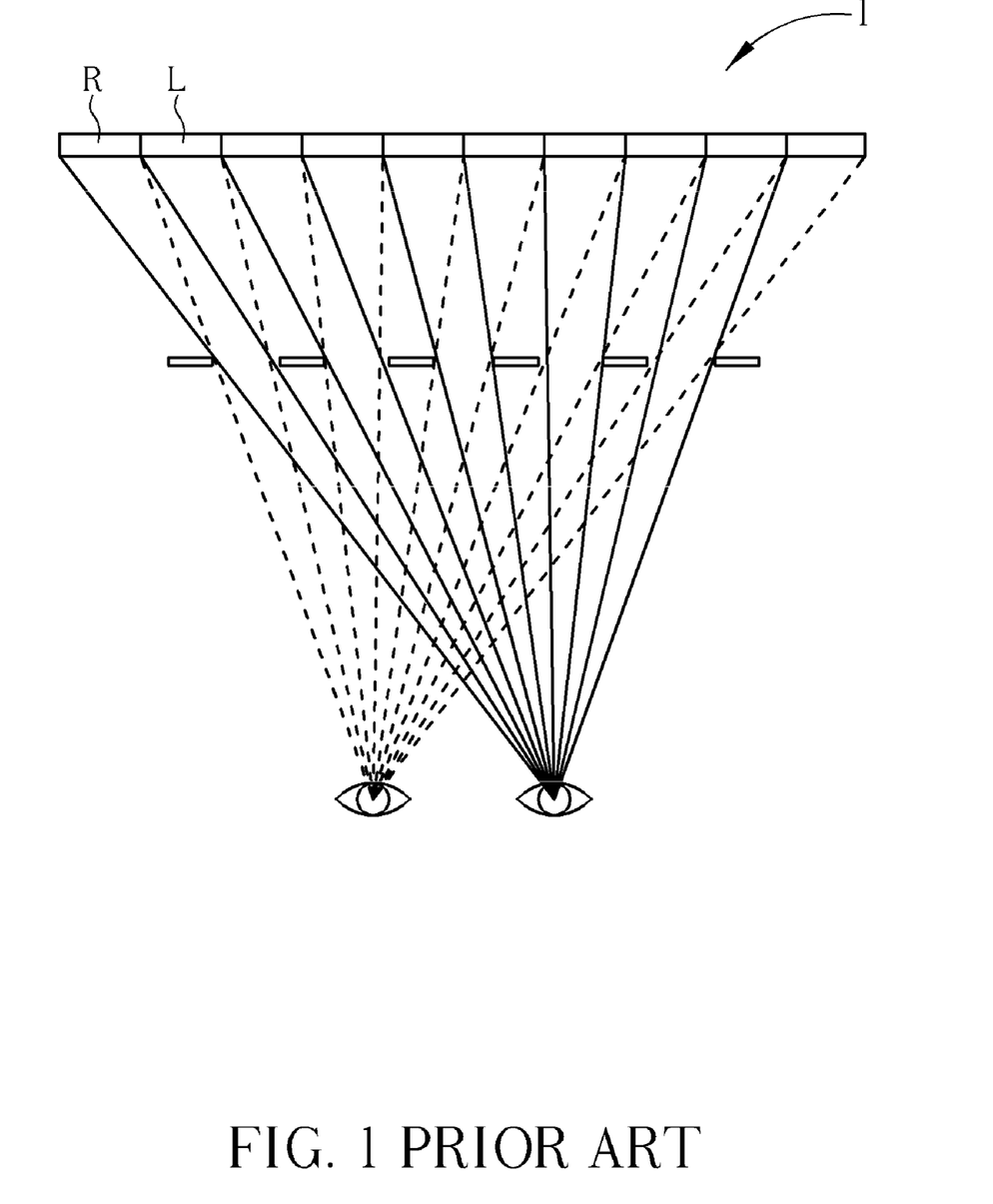
FIG. 1 is a schematic diagram illustrating the principle of producing a stereoscopic image.

In recent years, many stereoscopic display modes have been developed to make observers obtain stereoscopic images. A so-called stereoscopic image is produced by providing separated images to each eye respectively. The brain therefore analyzes the overlapping images and calculates the depth and gradation of each component to make the observer obtain a stereoscopic image. Hence, a stereoscopic device is a means to present different images to the left eye and the right eye individually so that the observer can sense a stereoscopic image. As shown in FIG. 1, the images for the left eye L and the right eye R are separated by the parallax barrier 1 and captured by the observer to produce a stereoscopic image.

In general, stereoscopic display devices can be classified into passive stereoscopic display devices and auto stereoscopic display devices. For passive stereoscopic display devices, the user should wear some assisting equipment, for example, polarization glasses. For auto stereoscopic display devices, the observer does not need to wear assisting equipment. The auto stereoscopic display devices can use a double convex lens, a lens array, or a parallax barrier to separate the images for the left eye and the right eye to produce a stereoscopic image, among which, the parallax barrier is the most widely used.

Figure 2:
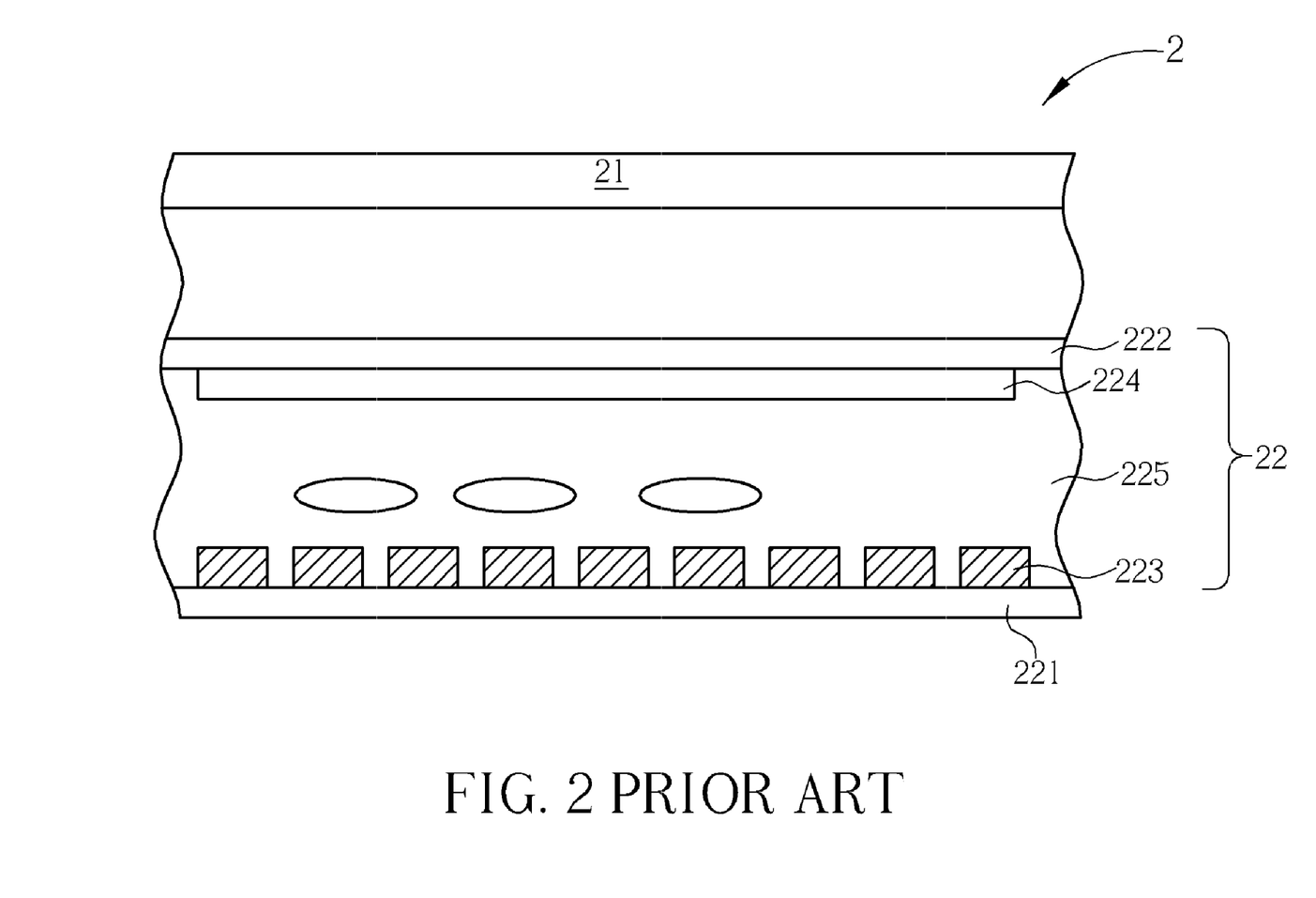
FIGS. 2, 3a and 3b are schematic diagrams illustrating the conventional parallax barrier.

A parallax barrier comprises a grating structure to separate the information of each eye. In general, the parallax barrier can be a simple grating structure made by plastics or metals like chromium, or be an LCD panel. Using an LCD panel as a parallax barrier can not only produce a 3D stereoscopic image. It also can be switched between 2D/3D modes freely by controlling the power. Please refer to FIG. 2, showing a schematic diagram illustrating a conventional stereoscopic display device using an LCD panel as the parallax barrier. The stereoscopic display device 2 comprises a display unit 21 and a parallax barrier 22. The display unit 21 can display images and generally is an LCD panel. The parallax barrier 22 comprises two substrates 221, 222 and two layers of ITO electrodes 223, 224 that are disposed on the two substrates 221, 222. The electrode 223 comprises a grating structure and the electrode 224 comprises a plane structure. A liquid crystal layer 225 is formed by injection liquid crystal molecular between the two electrodes 223, 224. When operating the 3D mode, a driving voltage is applied to the electrodes 223, 224 and the parallax barrier 22 forms a grating pattern that is bright-dark interlacing, therefore, the observer can obtain a stereoscopic image. On the other hand, when operating the 2D mode, no driving voltage is applied to the electrodes 223, 224, and the observer therefore obtains a flat 2D image. However, when under the 3D mode, at least half image of the display unit 21 is blocked by the grating pattern, thereby reducing half of the brightness and the resolution of the stereoscopic display device 2.

Figure 3A:
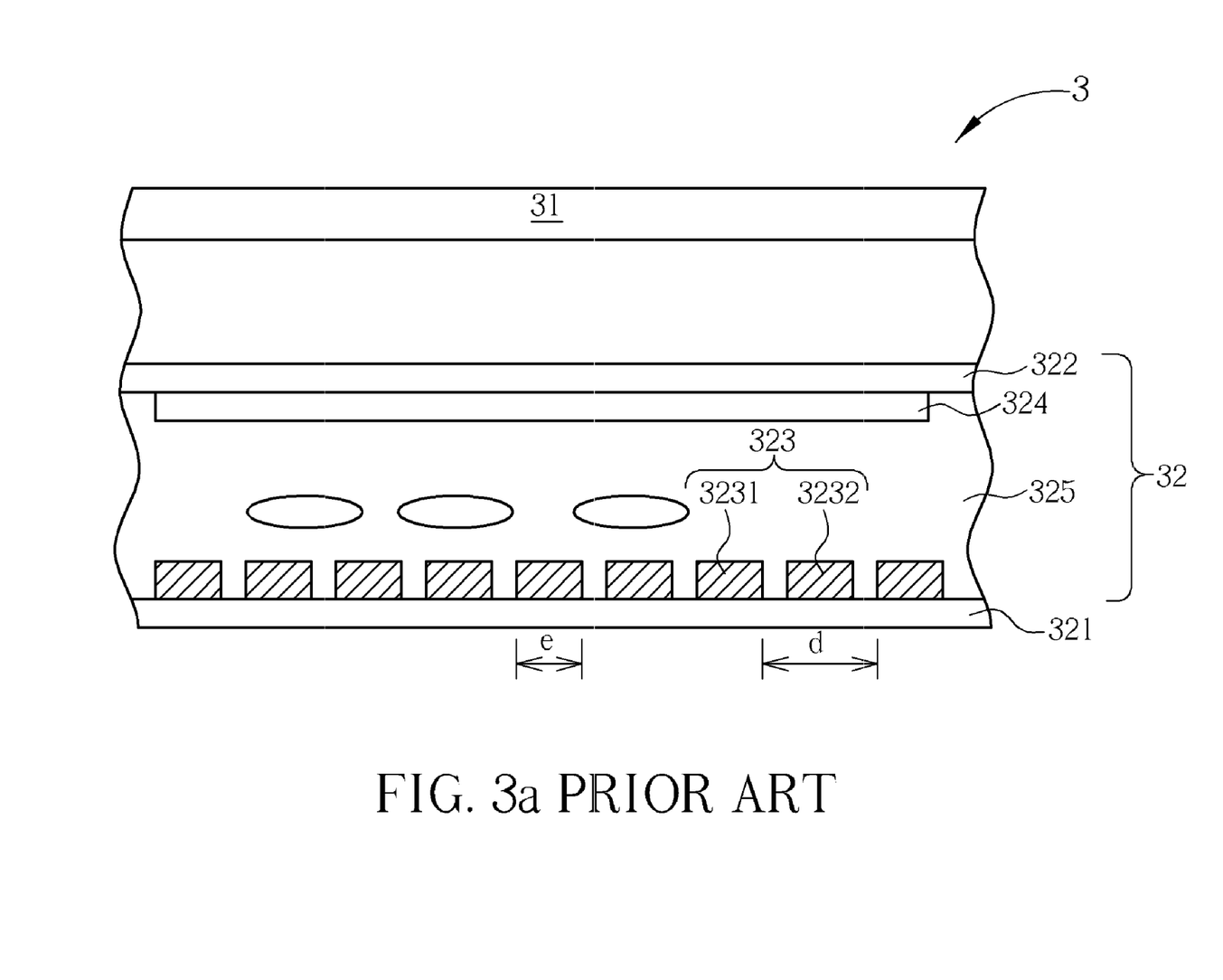
Figure 3B:
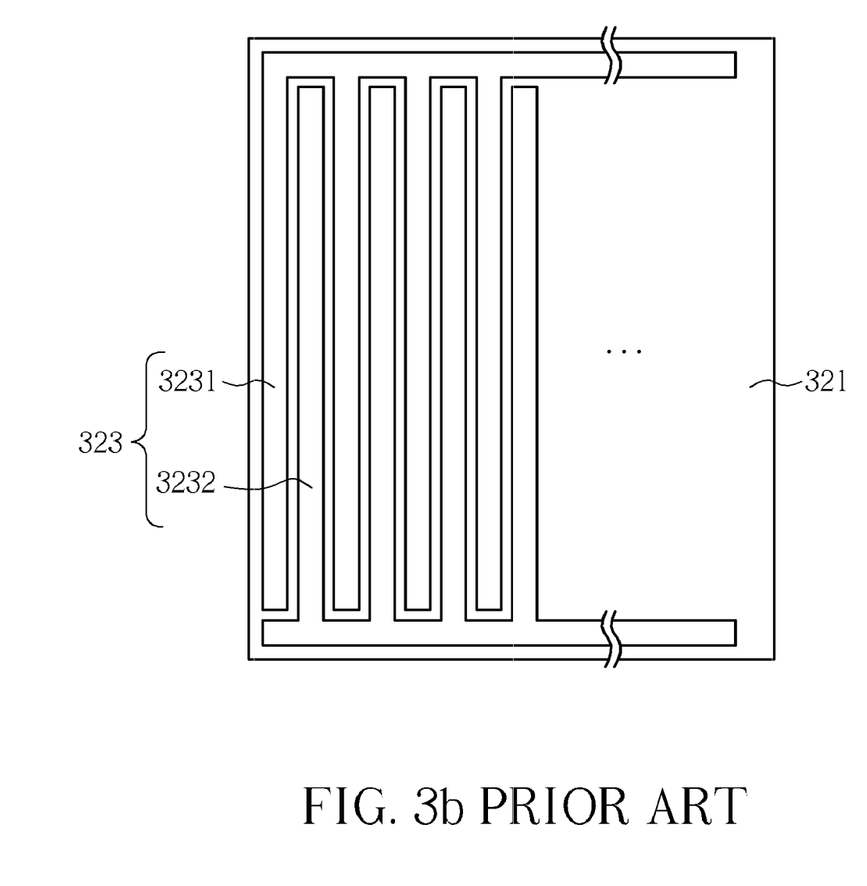

In order to solve this problem, a time-sharing type barrier is developed, as shown in FIGS. 3a and 3b. Compared to conventional arts, the electrodes 223 are divided into two groups, an odd electrode group 3231 and an even electrode group 3232. During the first period, a driving voltage is only applied to the odd electrode group 3231 and a grating pattern is formed; next during the second period, the driving voltage is switched to the even electrode group 3232 and the image for each eye is exchanged at the same time. As a result, the observer can obtain a 3D stereoscopic image in the same resolution as in the 2D mode when operating the first period and the second period periodically.

However, when the parallax barrier is in a normally white mode of transmission, only the portion of the charged electrode group turns to black. Whether in the first or second period, the opening aperture d in FIG. 3a is so large that the aperture ration exceeds up to 50%, causing serious cross-talk interruption between two eyes. Regarding this problem, EP1793623 discloses a stereoscopic display device that comprises an LCD panel in a normally black mode of transmission so that only the portions of charged electrodes turn to white and other portions remain black. The opening aperture e in FIG. 3a is small, keeping the lower aperture ratio and a better display quality. However in EP1793623, a normally black mode LCD is used as the parallax barrier, it can not be switched between 2D/3D modes and thereby causes poor utilization.

Accordingly, a parallax barrier that can be switched between 2D/3D modes and comprises a low opening aperture is still needed in the industry.

SUMMARY OF THE INVENTION

The present invention provides a parallax barrier to solve the problem of large aperture ratio in the conventional stereoscopic display device and still can be switched between 2D/3D display modes.

According to the claimed invention, the invention discloses a stereoscopic display device with a novel parallax barrier. The parallax barrier comprises: a first substrate, a plurality of first electrodes parallel to each other and stretching in one direction on the first substrate, a transparent insulation layer between the first substrate and the first electrodes, a plurality of second electrodes parallel to each other and stretching in one direction on the opposite side against the first electrodes, a common electrode between the second substrate and the transparent insulation layer, and a liquid crystal layer between the common electrode and the second electrodes. In particular, the plurality of first electrodes and second electrodes interlace with each other and each contains partial overlapping in the vertical direction.

The parallax barrier in the present invention can obtain a low aperture ratio when operating the time-sharing type mode, thereby preventing the cross-talk interruption and obtaining a better display quality.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ."

Figure 4A:
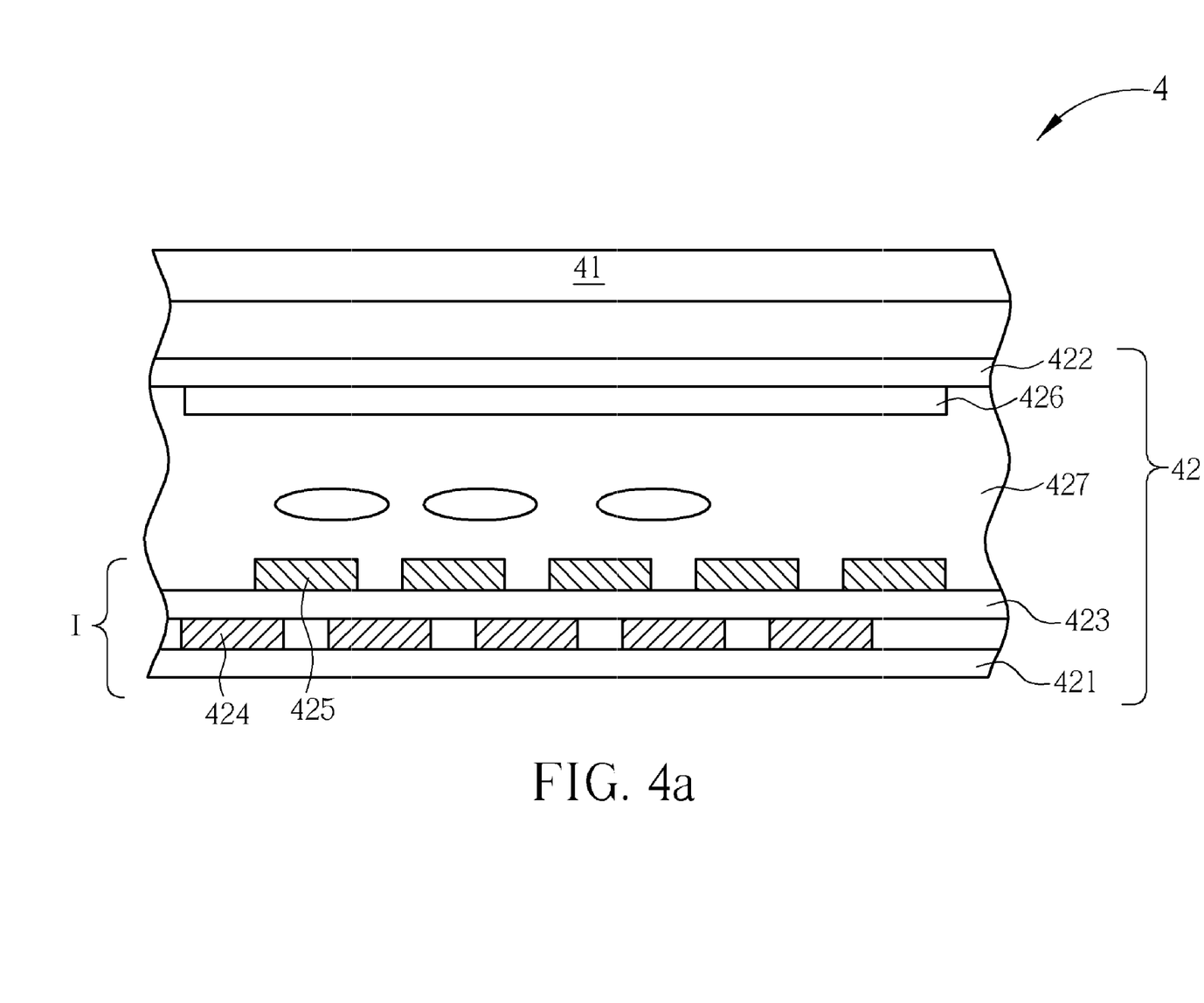
FIGS. 4a and 4b are schematic diagrams illustrating the parallax barrier in the present invention.
Figure 4B:
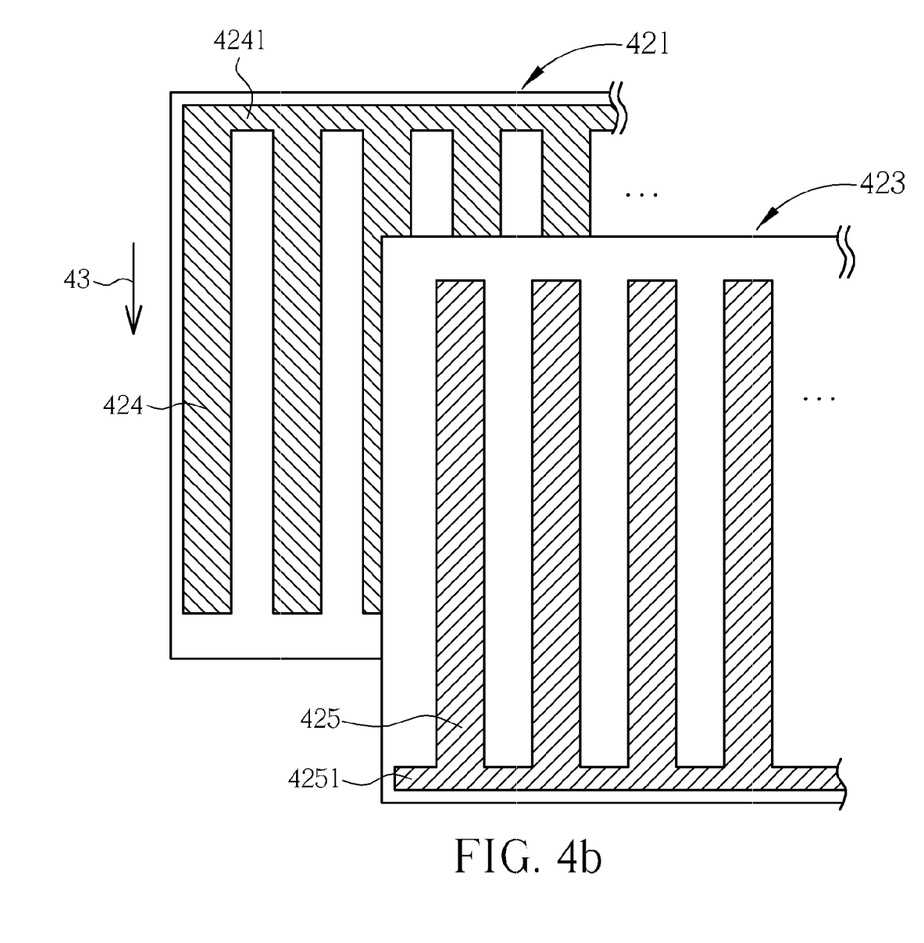

Please refer to FIG. 4, showing a schematic diagram illustrating one preferred embodiment of the stereoscopic display device in the present invention. FIG. 4a shows the cross-sectional view of the stereoscopic display device and FIG. 4b shows the top view of the section I in FIG. 4a.

As shown in FIG. 4a, the stereoscopic display device 4 in the present invention comprises a display unit 41 and a parallax barrier 42. The display unit 41 can display images for an observer and can be an LCD panel, a DPD panel or an LED panel, but should not be limited to those mentioned above.

The parallax barrier 42 comprises a first substrate 421, a second substrate 422 and a transparent insulation layer 423. The first substrate 421 and the second substrate 422 are disposed relatively in parallel and both can be made of glass, crystal or other transparent material. The transparent insulation layer 423 is disposed between the first substrate 421 and the second substrate 422. A plurality of the first electrodes is disposed between the first substrate 421 and the transparent insulation layer 423, each of which interlaces with each other and stretches along a first direction 43, as shown in FIG. 4b. The same ends of the first electrodes 424 are connected to each other by an extension part of the first electrodes 4241 that extends perpendicularly to the first direction 43. A plurality of second electrodes 425 are disposed between the transparent insulation layer 423 and the second substrate 422, each of which is parallel to each other and stretches in the first direction 43 on the transparent insulation layer 423, as shown in FIG. 4b. The same ends of the second electrodes 425 are connected to each other by an extension part of the second electrodes 4251 that extends perpendicularly to the first direction 43. Specially, the plurality of first electrodes 424 and the plurality of second electrodes 425 interlace with each other and each contains partial overlapping in the vertical direction.

Furthermore, a common electrode 426 is disposed between the second substrate 422 and the transparent insulation layer 423. The common electrode 426 is a flat film electrode layer and can be made of conductive film material, for example, an ITO, as well as in the first electrodes 424 and the second electrodes 425. The stereoscopic display device 4 in the present invention further comprises a liquid crystal layer 427 comprising liquid crystal molecular that can be twisted to shelter the light when applying an electric field. Specially, the parallax barrier 42 is in a normally black mode of transmission. When there is no voltage applied to the electrodes, the parallax barrier 42 is permeable to light passing, making it become white, while when a voltage is applied, the crystal molecules twist and thereby shelter the light, making it become black.

Figure 5:
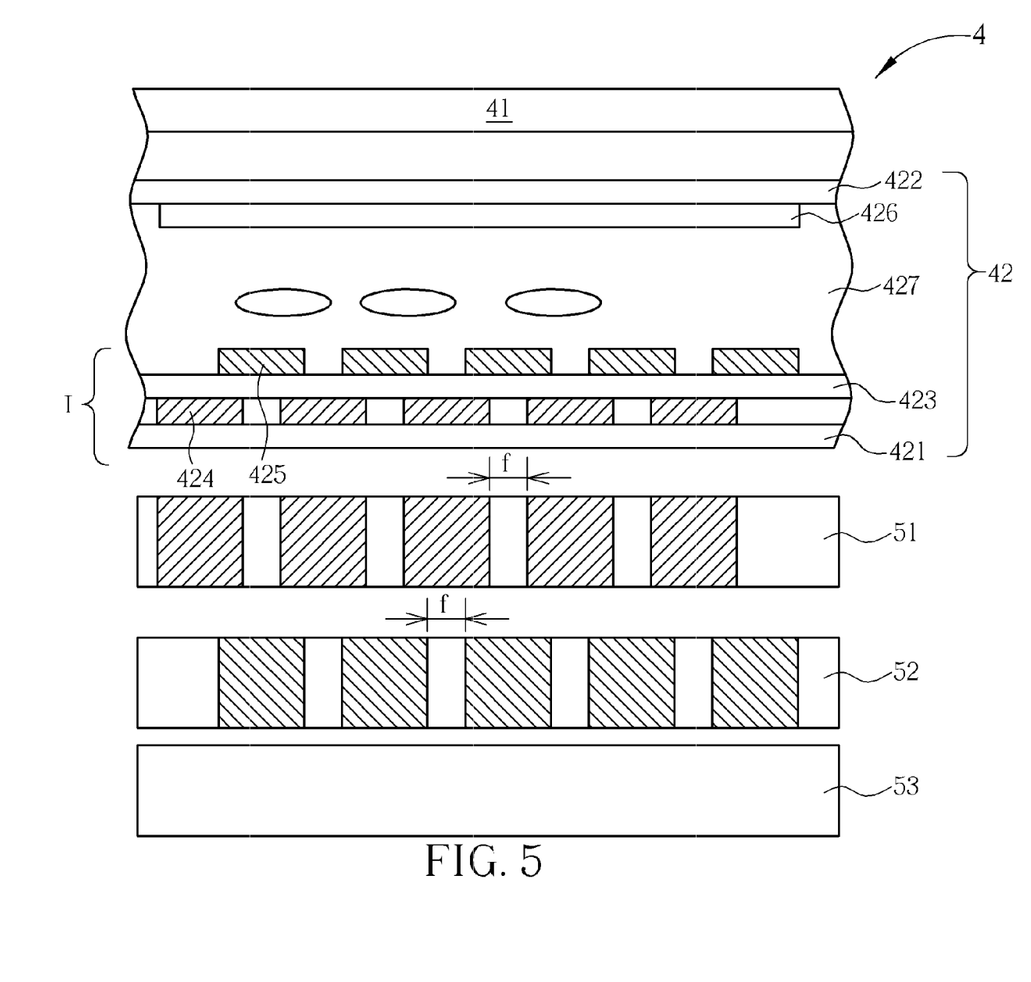
FIG. 5 is a schematic diagram illustrating the 2D/3D display mode of the stereoscopic display device in the present invention.

Please refer to FIG. 5, showing a schematic diagram illustrating the 2D/3D display modes of the stereoscopic display device 4 in the present invention. As shown in FIG. 5, under the 3D display mode, operation of the stereoscopic display device 4 comprises a first period and a second period. During the first period, a driving voltage is applied to the plurality of first electrodes 424 and no driving voltage is applied to the plurality of second electrodes 425. Because the parallax barrier 42 is in a normally white mode of transmission, only the charged electrodes display black. Accordingly, during the first period, the parallax barrier 42 forms a first period pattern 51 that is black-white interlacing. During the second period, a driving voltage is applied to the plurality of second electrodes 424 and no driving voltage is applied to the plurality of first electrodes 424. The parallax barrier 42 therefore forms a second period pattern 52. When operating the 2D mode, no driving voltage is applied to both of the first electrodes 424 and the second electrodes 425 and the light can pass through the parallax barrier 42, making it form a 2D mode pattern 53 that is fully bright.

According to the operating mode of the stereoscopic display device 4 in FIG. 5, the opening aperture f is small whether in the first period or the second period. The aperture ratio 42 maintains in small range so as to prevent the crosstalk phenomenon in conventional art. Furthermore, the time sharing operation type that comprises the first period and the second period is utilized in the stereoscopic display device 4, which can avoid the display device becoming half in brightness and resolution in conventional art and can also be switched between 2D/3D modes freely.

Figure 6A:
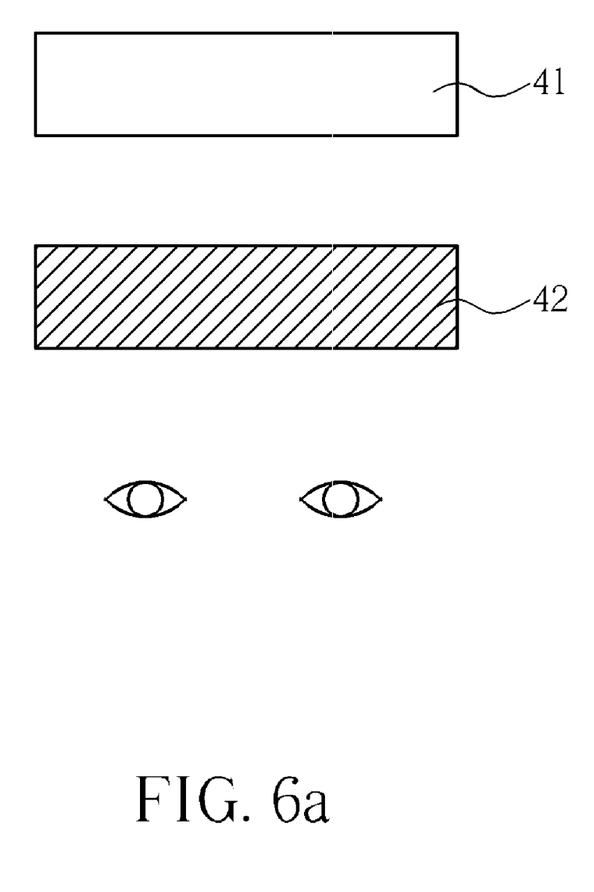
FIGS. 6a to 6c are schematic diagrams illustrating the positional arrangement of the stereoscopic display device in the present invention.
Figure 6B:
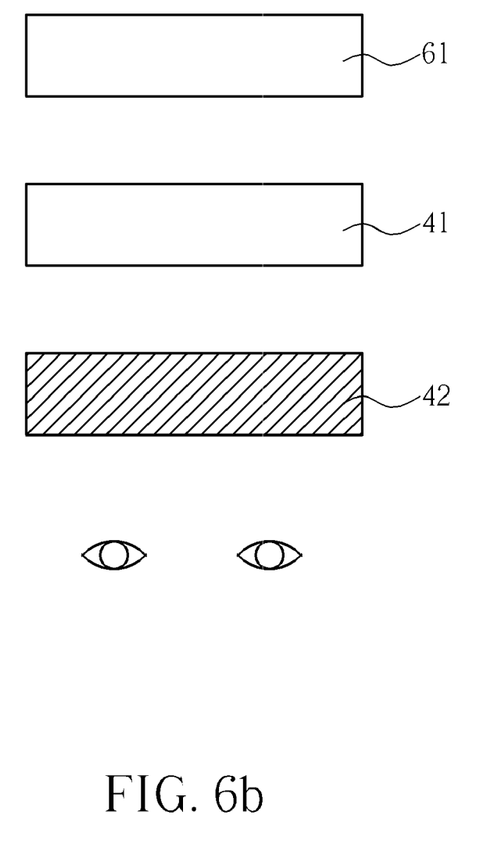
Figure 6C:
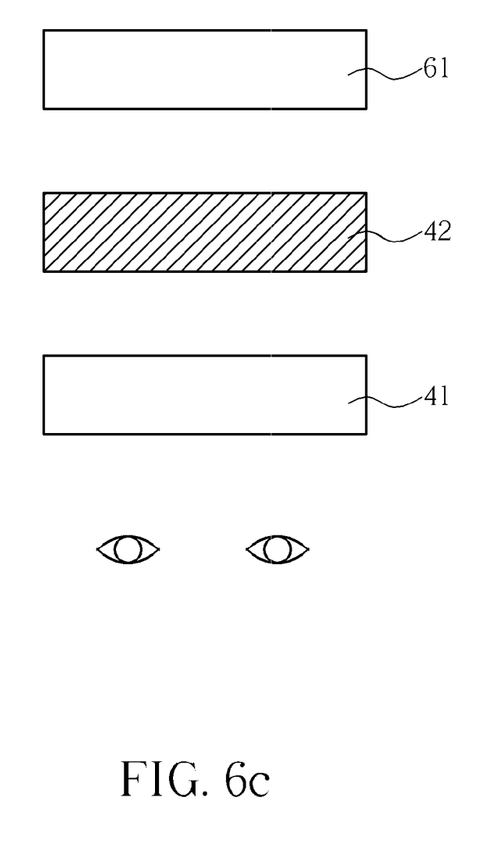

Please refer to FIG. 6, showing a schematic diagram illustrating the positional arrangement of the stereoscopic display device in the present invention. Please refer to FIG. 6a, the parallax barrier 42 is disposed between the display unit 41 and an observer. The image displayed by the display unit 41 is separated to the left eye information and the right eye information individually and the observer can therefore obtain a stereoscopic image However, when the display unit 41 is a liquid crystal panel, a backlight module 61 is needed to provide light source because the liquid crystal molecular does not emit light by itself. The display unit 41 can be disposed between the backlight module 61 and the parallax barrier 41, as shown in FIG. 6b, or the parallax barrier 42 can be disposed between the display unit 41 and the backlight module 61, as shown in FIG. 6c. The observer can obtain a stereoscopic image in both of the embodiments.

Those skilled in the art will readily observe that numerous modifications and alterations of the device and method may be made while retaining the teachings of the invention.

What is claimed is:

1. A parallax barrier, comprising:
   a first substrate;
   a plurality of first electrodes disposed on the first substrate, wherein each first electrode is parallel to each other and stretches in a first direction on the first substrate;
   a transparent insulation layer disposed between the first substrate and the plurality of first electrodes;
   a plurality of second electrodes disposed on the opposite side against the plurality of first electrodes of the transparent insulation layer, wherein each second electrode is parallel to each other and stretches in the first direction on the transparent insulation layer;
   a second substrate disposed relatively to the first substrate;
   a common electrode disposed between the second substrate and the transparent insulation layer; and
   a liquid crystal layer disposed between the common electrode and the plurality of second electrodes;
   wherein the plurality of first electrodes and the plurality of second electrodes interlace with each other and each contains partial overlapping in the vertical direction.

2. The parallax barrier of claim 1, wherein the same ends of the plurality of first electrodes are connected to each other by an extension part of the first electrodes that extends perpendicularly to the first direction.

3. The parallax barrier of claim 1, wherein the same ends of the plurality of second electrodes are connected to each other by an extension part of the second electrodes that extends perpendicularly to the first direction.

4. The parallax barrier of claim 1, wherein the parallax barrier is in a normally black mode of transmission.

5. A stereoscopic display device, comprising:
   a display unit that displays images; and
   a parallax barrier comprising a plurality of first electrodes and a plurality of second electrodes, wherein the plurality of first electrodes and the plurality of second electrodes are parallel to each other and stretch in a first direction, and the plurality of first electrodes and plurality of second electrodes interlace with each other and each contains partial overlapping in the vertical direction.

6. The stereoscopic display device of claim 5, wherein the parallax barrier comprises:
   a first substrate, wherein each first electrode is disposed on the first substrate;
   a transparent insulation layer disposed between the first substrate and the plurality of first electrodes, wherein the plurality of second electrodes are disposed on the opposite side against the plurality of first electrodes of the insulation layer and each second electrode is disposed on the transparent insulation layer;
   a second substrate disposed relatively to the first substrate;
   a common electrode disposed between the second substrate and the transparent insulation layer; and
   a liquid crystal layer disposed between the common electrode and the plurality of second electrodes.

7. The stereoscopic display device of claim 5, wherein the same ends of the plurality of first electrodes are connected to each other by an extension part of the first electrodes that extends perpendicularly to the first direction.

8. The stereoscopic display device of claim 5, wherein the same ends of the plurality of second electrodes are connected to each other by an extension part of the second electrodes that extends perpendicularly to the first direction.

9. The stereoscopic display device of claim 5, wherein the parallax barrier is in a normally white mode of transmission.

10. The stereoscopic display device of claim 5, wherein the parallax barrier is disposed between the display unit and an observer.

11. The stereoscopic display device of claim 5, wherein the display unit comprises an LCD panel.

12. The stereoscopic display device of claim 11, wherein the stereoscopic display device further comprises a backlight module.

13. The stereoscopic display device of claim 12, wherein the parallax barrier is disposed between the display unit and the backlight module.

14. The stereoscopic display device of claim 5, wherein under the 2D display mode, no driving voltage is applied to the plurality of first electrodes and the plurality of second electrodes.

15. The stereoscopic display device of claim 5, wherein under the 3D display mode,
   during a first period, a driving voltage is applied to the plurality of first electrodes and no driving voltage is applied to the plurality of second electrodes; and
   during a second period, a driving voltage is applied to the plurality of second electrodes and no driving voltage is applied to the plurality of first electrodes.

* * * * *